(12) United States Patent
Hugues et al.

(10) Patent No.: US 6,476,643 B2
(45) Date of Patent: Nov. 5, 2002

(54) ASYNCHRONOUS CIRCUIT FOR DETECTING AND CORRECTING SOFT ERROR AND IMPLEMENTATION METHOD THEREOF

(75) Inventors: Jean-Francois Hugues, Saint Nazaire des Eymes; Pascal Vivet, Saint Martin d'Heres, both of (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/972,233

(22) Filed: Oct. 5, 2001

(65) Prior Publication Data

US 2002/0043989 A1 Apr. 18, 2002

(30) Foreign Application Priority Data

Oct. 6, 2000 (FR) .............................................. 00 12826

(51) Int. Cl.[7] .............................................. H03K 19/00
(52) U.S. Cl. ................................ 326/93; 326/9; 326/14
(58) Field of Search ................................ 326/9, 14, 82, 326/93, 94

(56) References Cited

U.S. PATENT DOCUMENTS

| | | |
|---|---|---|
| 5,691,652 A | 11/1997 | Miller, Jr. et al. |
| 5,918,042 A | 6/1999 | Furber |
| 6,140,836 A * | 10/2000 | Fujii et al. ..................... 326/35 |
| 6,373,289 B1 * | 4/2002 | Martin et al. .................. 326/93 |

OTHER PUBLICATIONS

French Preliminary Search Report dated May 22, 2001 for French Application No. 0012826.

* cited by examiner

*Primary Examiner*—Michael Tokar
*Assistant Examiner*—Anh Tran
(74) *Attorney, Agent, or Firm*—Lisa K. Jorgenson; Jose Gutman; Fleit, Kain, Gibbons, Gutman & Bongini P.L.

(57) ABSTRACT

A micro-pipeline type asynchronous circuit and a method for detecting and correcting soft error. The asynchronous circuit records in a first recording unit a signal output by a calculation unit and then records in a second recording unit the same signal delayed by at least the duration of the pulse of a soft error. The recorded signals then are compared in a comparer circuit. If they are identical, no soft error has been detected and the output signal is recorded after another delay that is longer than the pulse duration of the soft error, and a request signal is transmitted to a control unit of a next logic stage with a delay twice as long as the pulse duration of a soft error.

19 Claims, 3 Drawing Sheets

ASYNCHRONOUS CIRCUIT FOR DETECTING AND CORRECTING SOFT ERROR AND IMPLEMENTATION METHOD THEREOF

CROSS-REFERENCE TO RELATED APPLICATIONS

This application is based upon and claims priority from prior French Patent Application No. 00 12826, filed on Oct. 6, 2000, the entire disclosure of which is herein incorporated by reference.

BACKGROUND OF THE INVENTION

1. Field of the Invention

The present invention relates to an asynchronous circuit with a micro-pipeline type execution structure for detecting and correcting soft error in digital integrated circuits. It also relates to an implementation method.

2. Description of the Prior Art

In integrated logic circuits a soft error is a non-recurring event that disturbs the signal at a particular time. This type of disturbance, which is of extremely short duration, causes unwanted changes in the signal emitted by one or more logic gates of the digital integrated circuit. Such disturbances are caused particularly by alpha particles radiation. A logic circuit affected by alpha particles undergoes a sudden change in the logic status of its output terminal. Soft error can be also caused by events such as electromagnetic phenomena, etc.

It has hitherto been known in the art to detect and treat soft error on the output of a logic calculation unit of synchronous circuits in which the operation is governed by the appearance of a particular event such as a clock signal. A variety of methods have been used to ensure that the signal output by a logic calculation unit is not affected by soft error.

One of these methods consists in using a majority logic circuit in which the input terminals are connected to the output terminal of the logic calculation unit via a sampling circuit. The output signal of the logic calculation unit is sampled at three different times: t, t+d and t+2d. The time needed to perform the three samplings must be greater than at least twice the maximum duration of a potential soft error in order to be sure of producing a correct output signal. The three sampled signals are applied to the input terminals of the majority logic circuit. This majority logic circuit selects the logic signal with the greatest probability of being correct when one of the sampled signals provides a signal that is different from the two others and can thereby be used to check the operation of the logic calculation unit.

If the three input terminals of the majority logic circuit have the same status it is highly unlikely that the logic calculation unit has committed an error during the time taken to effect the three samples. The output of the majority logic circuit thus has the same status as that of the three inputs and thus transmits the logic signal supplied by the logic calculation unit.

If, on the other hand, any two of the inputs of the majority logic circuit have the same logic status and the third input has a different logic status, it is unlikely that the logic calculation unit has committed the same error twice during the time taken to effect the three samples and that it has functioned correctly for the sampled output applied to the third input of the majority logic circuit. The samples with the same logic status are thus in the majority and consequently the output of the majority logic circuit adopts the same logic status to transmit the signal.

This method, which combines a circuit that samples a signal output by a logic calculation unit with a majority logic circuit, uses a temporal redundancy to process the soft error in synchronous integrated circuits. This method is based on the fact that the duration of the soft error is known.

Other methods for processing soft error are used in synchronous circuits. One such method, rather than using a temporal redundancy, uses a total or partial hardware redundancy by adding another logic calculation unit in addition to that to be checked and compares their output signals.

Nevertheless, there are a certain number of drawbacks to these methods for checking soft error in synchronous circuits.

Firstly, methods which use a hardware redundancy involve increases in costs that are unacceptable when such products are intended for industry producing mass consumer electronics.

There are also drawbacks to methods for checking soft error based on temporal redundancy. On the one hand, they increase the time required to pass through the logic path by adding a duration greater than twice the duration of the soft error.

On the other, when the logic calculation unit is performing a large number of logic operations the duration of the soft error may not be easy to establish. An error that disturbs the signal output by the logic calculation unit with a maximum duration that is normally of the order of a few hundred picoseconds then propagates and its impact at the end of a long logic path may transform a pulse measuring one hundred picoseconds into a pulse measuring one nanosecond due to the different propagation times of the different electrical paths. Therefore when large logic calculation units are used, methods for correcting soft error in synchronous circuits based on the type of temporal redundancy described above are difficult to implement, particularly where sampling is concerned, because the duration of the soft error may be variable.

Lastly, it is not possible in synchronous circuits to recalculate the correct value output by the logic calculation unit on the fly. When an error is detected in the signal on output of a logic calculation unit the entire instruction must be performed, which wastes time.

Until now soft error was only detected and processed in synchronous circuits. Asynchronous circuits operating as micro-pipelines were not protected against soft error because such circuits are still very little used in integrated circuits. In pipeline-asynchronous operating modes the lack of a clock signal to time the performance of instructions, the performance of instructions is broken down more than in synchronous operating modes.

FIG. 1 shows a succession of logic stages E0, E1, E2 of a micro-pipeline type asynchronous circuit of the prior art. Each logic stage E0, E1, E2 has the same structure. Thus logic stages E0, E1, E2 each include a logic calculation unit respectively numbered 9, 1 and 5, storage means composed of a latch circuit respectively numbered 10, 2 and 6, a control unit respectively numbered 11, 3 and 7, and a delay line respectively numbered 12, 4 and 8. The description states that a logic stage of an asynchronous circuit of the prior art will be considered with reference to FIG. 2.

The control unit 3 of logic stage E1 receives a signal Aout sent by control unit 7 of the next logic stage E2, together with a signal Rin sent by control unit 11 of the previous stage E0, both received via delay line 12. Control unit 3 of logic stage E1 is also provided to transmit a signal Rout to control unit 7 of the next logic stage E2, together with a signal Ain to control unit 11 of the previous stage E0.

Logic stages E0, E1 and E2 communicate using a local check. The operation of asynchronous circuits is based on the propagation of data and the use of a communication protocol that is used with request and acknowledgement signals. Thus logic stages E0, E1 and E2, and more particularly their respective control units 11, 3 and 7, interact by means of signals Rin and Rout, known as request signals, and signals Ain and Aout, known as acknowledgement signals.

FIG. 2 shows a standard micro-pipeline type asynchronous architecture of the prior art and particularly shows the logic stage E1 of FIG. 1. The same references are used for components already described with reference to FIG. 1.

Logic calculation unit 1 supplies an output signal Din that is applied to the input terminal of the storage means consisting of latch circuit 2. Latch circuit 2 transmits an output signal Dout that is applied to the logic calculation unit 5 of the next logic stage E2. Latch circuit 2 is controlled by control unit 3 using a data capture signal Lt. Control unit 3 receives the signals Rin and Aout and transmits signals Rout and Ain. Signal Rout is applied to a delay line 4 that delays transmission of signal Rout.

Signal Rin is a request signal transmitted to control unit 3 to trigger capture of the data output by logic calculation unit 1. Data capture begins as soon as signal Aout is received by control unit 3 indicating that the calculation performed by the next logic stage E2 is complete, i.e., that the next stage E2 is ready to receive data. Reception by control unit 3 of signals Rin and Aout causes data capture signal Lt to be sent to latch circuit 2. This data capture signal Lt controls latch circuit 2 to record the state of signal Din at instant Lt. Latch circuit 2 may, for example, be a bistable circuit that temporarily stores binary data Din on output of logic circuit 1, thereby constituting a buffer memory. The request signal Rout is immediately sent by control unit 3 to the control unit of the next logic stage E2 to trigger capture of the data on output of logic calculation unit 5. On the output terminal of latch circuit 2 the signal Dout is transmitted to logic calculation unit 5. Latch circuit 2 is again set to store binary data Din. Launch of the operation to trigger capture of data on output of logic calculation unit 5 belonging to the next logic stage E2 by means of signal Rout may be delayed by means of delay line 4. Finally control unit 3 sends the previous logic stage an acknowledgement signal Ain signifying that logic stage E1 is ready to receive data.

However, this type of asynchronous circuit of the prior art is not designed to manage calculation errors caused by soft error.

Accordingly, there exists a need for overcoming the disadvantages of the prior art as discussed above.

SUMMARY OF THE INVENTION

A main aim of the present invention is to overcome malfunctions due to soft error in micro-pipeline type asynchronous logic circuits to provide asynchronous logic circuits that are protected against soft error.

Another aim of the invention is to implement a method for detecting and correcting soft error in asynchronous circuits designed to be applied to any micro-pipeline type asynchronous circuit in order to execute instructions.

The invention relates to an asynchronous circuit with a micro-pipeline type method of executing instructions suitable for detecting and correcting soft error in digital integrated circuits, comprising at least one logic stage, each logic stage comprising a logic calculation unit whose output terminal transmits an output signal, a first recording means one of the input terminals of which is connected to the output terminal of the logic calculation unit, a control unit one of whose three output terminals transmits a first data capture signal applied to the second input terminal of the first recording means, the other two output terminals of the control unit being respectively connected to an input terminal of the control unit of the previous logic stage, and to an input terminal of the control unit of the next logic stage by means of a delay line, wherein said asynchronous circuit also comprises a second recording means one of whose input terminals is connected to the output terminal of the logic calculation unit, means in the control unit for delaying the first data capture signal and providing a second data capture signal that is applied to the second recording means, a comparer circuit one of whose input terminals is connected to the output terminal of the first recording means and whose other input terminal is connected to the output terminal of the second recording means, said comparer circuit supplying an output signal that indicates in a first status that no soft error is present and in a second status that a soft error is present, and a programmable delay line whose first input terminal is connected to the output terminal of the comparer circuit, a second input terminal being connected to the output terminal of the delay line via a first delayed path and a last input terminal being connected to the output terminal of the delay line via a second non-delayed path.

The invention also relates to a method for detecting and correcting a soft error in micro-pipeline type asynchronous circuits consisting of at least one logic stage, wherein it can be applied to each logic stage and comprises the following stages:

a) recording in a first recording means the status of a signal output by a calculation unit;

b) recording in a second recording means the status of the said signal output by the said logic calculation unit with a delay longer than the pulse duration of a soft error;

c) comparing the recorded signals in a comparer circuit to transmit a signal carrying either information corresponding to a first status in which the compared signals are identical or information corresponding to a second status in which the compared signals are different, and for the first status:

d1) providing a request signal for the control unit of the next logic stage without any delay, or for the second status:

d2) recording the status of the signal output by the logic calculation unit a second time after another delay that is longer than the pulse duration of an error, and then sending a request signal to the control unit of the next logic stage with a delay twice as long as the pulse duration of a soft error.

BRIEF DESCRIPTION OF THE DRAWINGS

Other characteristics and advantages of the present invention will be better understood from the following detailed description of an example of the invention and refers to the attached figures where.

DESCRIPTION OF THE PREFERRED EMBODIMENTS

Figure 1:
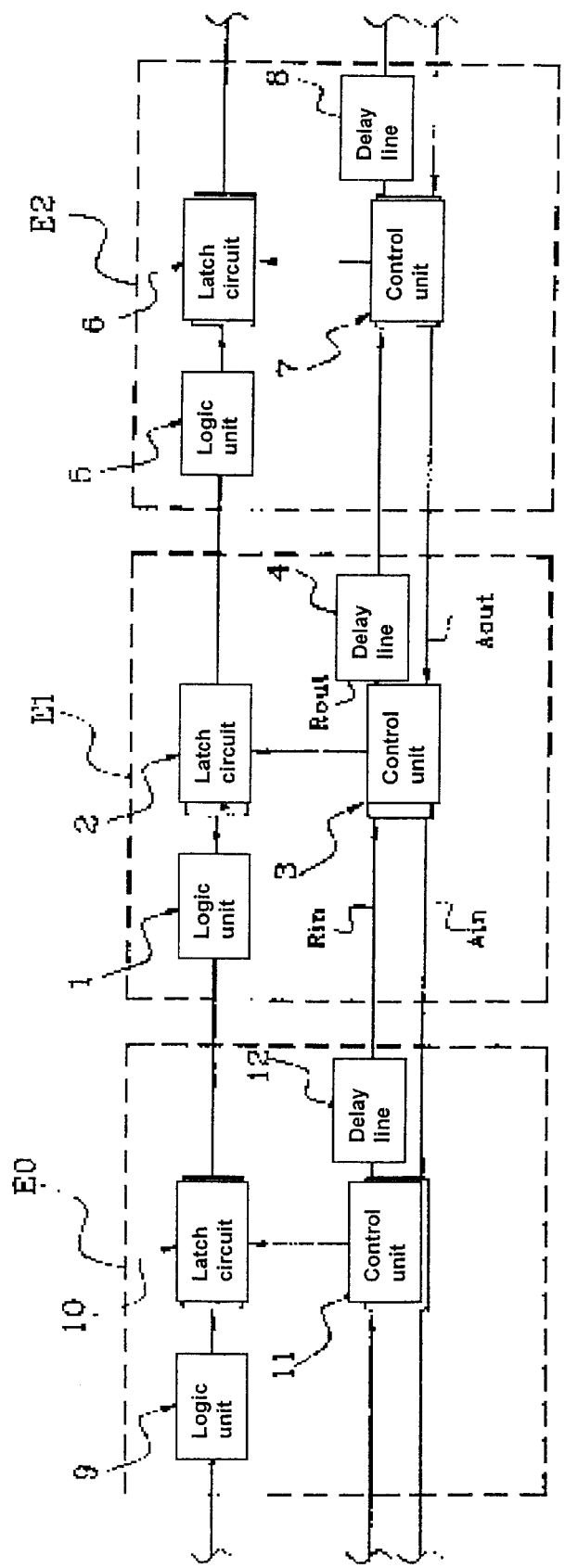
FIG. 1 is a diagram showing the succession of logic stages in a micro-pipeline type asynchronous circuit of the prior art, as described in the foregoing introduction.
Figure 2:
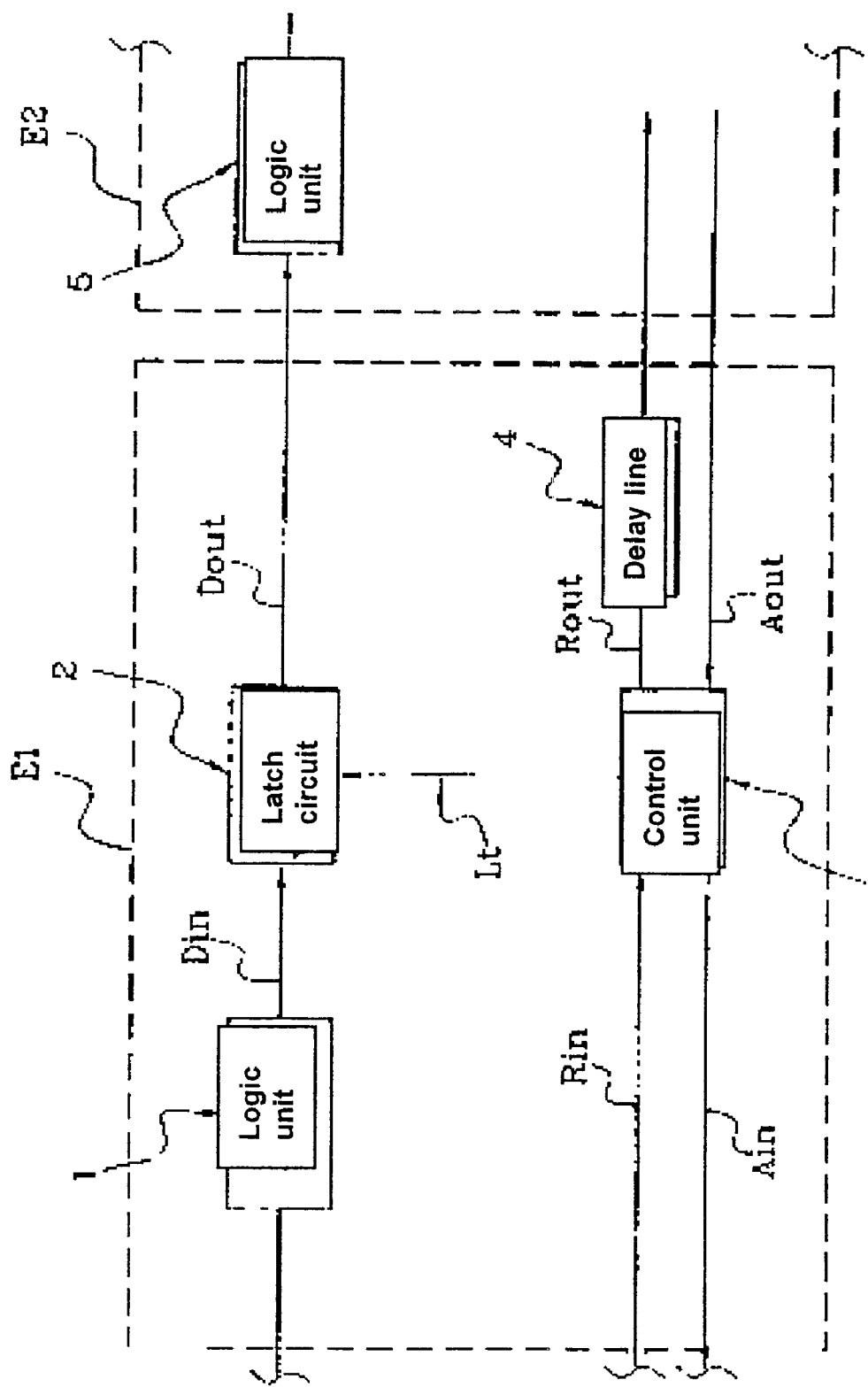
FIG. 2 is a detailed diagram of a logic stage of FIG. 1 showing a micro-pipeline type asynchronous architecture of the prior art, as described in the foregoing introduction.
Figure 3:
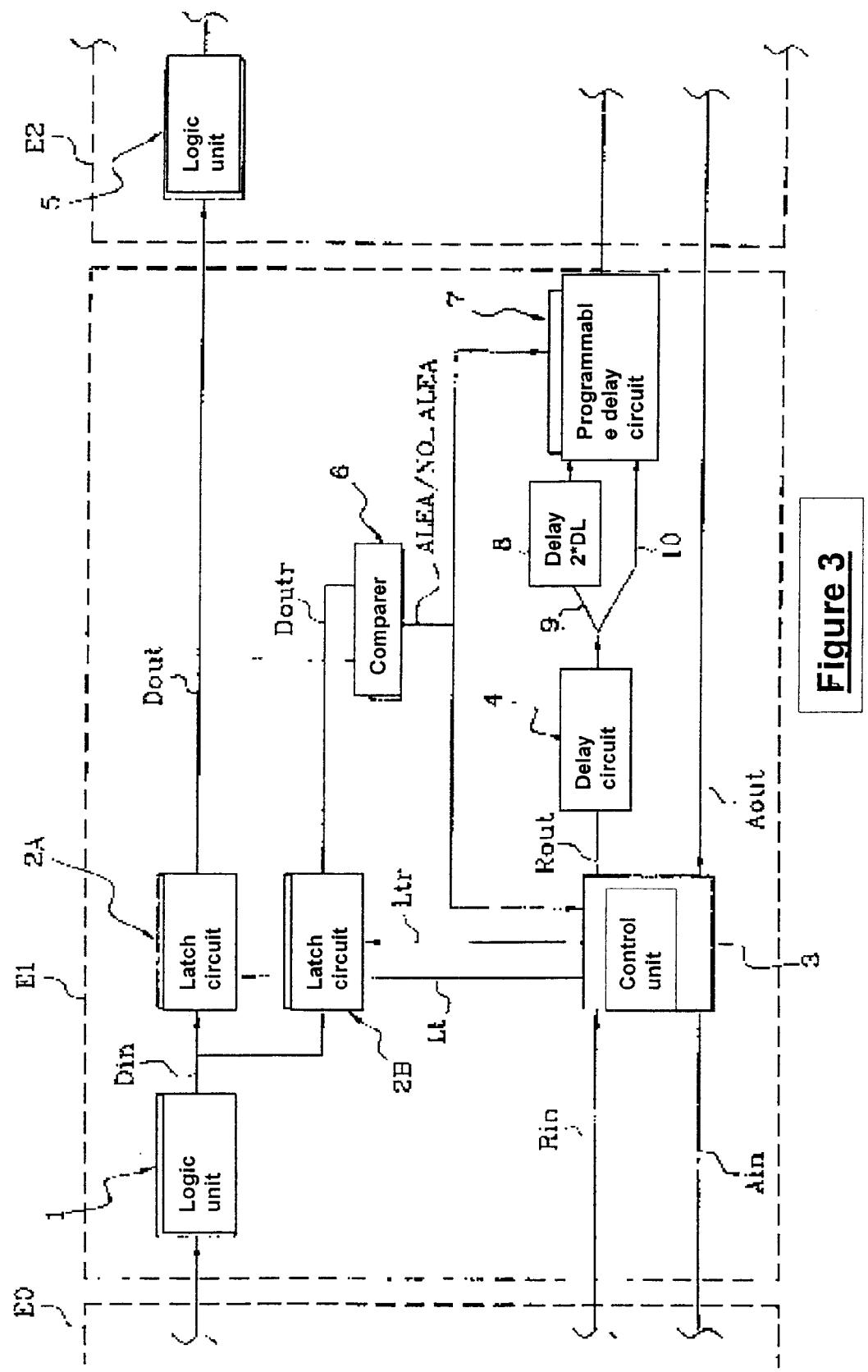
FIG. 3 is a detailed diagram of a micro-pipeline type asynchronous logic stage according to a preferred embodiment of the present invention that performs detection and correction of soft error.

FIG. 3 shows a logic stage E1 of a micro-pipeline type asynchronous circuit according to the invention that performs detection and correction of soft error. The same references are used for components common to FIGS. 1 and 2. It should also be noted that each logic stage E0, E1 and E2 has the same structure and that the succession of different logic stages E0, E1 and E2 is implemented in the same way as in FIG. 1 of the prior art.

Logic stage E1 of the invention comprises logic calculation unit 1, the input terminal of which is connected to the output terminal of the latch circuit of the previous logic stage and whose output stage, which transmits the signal Din, is connected to an input terminal of first recording means consisting of a latch circuit 2A and an input terminal of a second recording means consisting of a latch circuit 2B.

Both latch circuits 2A and 2B have a second input terminal that is connected to an output terminal of control unit 3. This control unit 3 therefore supplies a first data capture signal Lt applied to the first latch circuit 2A and a second data capture signal Ltr applied to the second latch circuit 2B which is the same as signal Lt but delayed a certain time.

Control unit 3 comprises two other connected output terminals, one providing acknowledgement signal Ain to the input terminal of the control unit of the previous stage E0 and the other providing a request signal Rout to the input terminal of the control unit of the next stage E2 by means of circuits that are described below.

Control unit 3 comprises two input terminals, one of which is connected to receive request signal Rin, to the output terminal of the control unit of previous logic stage E0, and the other, which receives the acknowledgement signal Aout, to the output terminal of the control unit of the next logic stage E2.

The output terminal of the first latch circuit 2A that supplies signal Dout is connected firstly to the input terminal of logic calculation unit 5 of the next stage E2, and secondly to one of the two input terminals of a comparer circuit 6.

The output terminal of the second latch circuit 2B transmitting the signal Doutr is connected to the second input terminal of comparer circuit 6.

Signal Dout consists of signal Din at signal instant Lt plus the propagation time of latch circuit 2A while signal Doutr consists of signal Din at delayed signal instant Ltr plus the propagation time of latch circuit 2B.

Comparer circuit 6 comprises an output terminal providing a single signal ALEA/NO-ALEA either carrying the data ALEA or NO-ALEA and is connected both to another input terminal of control unit 3 and one of the three input terminals of a programmable delay circuit 7.

The output terminal of control unit 3, which supplies request signal Rout, is connected to an input terminal of a delay circuit 4 the output terminal of which is connected via a first delayed path 9 to a second input terminal of programmable delay circuit 7 and via a second non-delayed path 10 to a last input terminal of programmable delay circuit 7.

The delayed path comprises a circuit 8 that introduces a duration of 2*DL into the transmission of signal Rout. Duration DL is defined below.

Programmable delay circuit 7 comprises an output terminal connected to the input terminal of the control unit of the next logic stage E2.

Logic calculation unit is liable to soft error. It will be assumed that this soft error is very brief, i.e., of the order of a few hundred picoseconds. It will also be assumed that the probability of a soft error occurring twice in a single calculation in a logic calculation unit is extremely small. The soft error is a non-recurrent event.

The request signal Rin of the previous stage E0 is applied to control unit 3 to trigger capture of data output by logic calculation unit 1, i.e., so that control unit 3 transmits capture signal Lt when the signal Aout of the next stage E2 is received. When this signal Lt is applied to first latch circuit 2A, it orders latch circuit 2A to record the status of output signal Din of logic calculation unit 1. Control unit 3 then transmits the second capture signal Ltr applied to the second latch circuit 2B, which consists of signal Lt delayed by a duration DL greater than the known pulse duration of a soft error Derreur (DL>Derreur). This signal Ltr commands latch circuit 2B to record the status of signal Din of logic calculation unit 1.

The delay introduced into data capture signal Ltr may, for example, be generated in control unit 3 by a chain of inverters or an RC network. The data capture signal Lt is used to store and stabilise the binary data Din in first latch circuit 2A. Delayed data capture signal Ltr simultaneously records binary data Din a second time in latch circuit 2B with a certain delay. This delay is selected so that its duration DL is greater than the duration of soft error pulse Derreur (DL>Derreur). Binary data Din is thus recorded at two different times.

Immediately after control unit 3 has transmitted first capture signal Lt to first latch circuit 2A, request signal Rout is transmitted by control unit 3 and the calculation begins in the next logic calculation unit 5. At the same time the signal Doutr, which consists of the signal Din at the instant of delayed signal Ltr, is compared with signal Dout, which consists of the signal Din at the instant of signal Lt in comparer circuit 6. The signal Dout, which consists of signal Din at the instant of signal Lt, is also transmitted to the input terminal of logic calculation unit 5 of the next logic stage E5. The two latch circuit latch circuits 2A and 2B are again capable of recording binary data. One of the two signals Dout or Doutr must consist of the correct result expected on output of logic calculation unit 1 as it is considered highly improbable that a soft error might occur twice.

If the compared signals Dout and Doutr are identical, this means that no soft error has occurred. The result on the output of logic calculation unit 1 is therefore correct and the calculation may continue in the next logic calculation unit 5. Comparer 6 transmits the signal carrying the NO-ALEA data to control unit 3 and programmable delay circuit 7 indicating that the signals compared are identical and that no soft error has therefore occurred.

Programmable delay circuit 7 then authorizes transmission of signal Rout to the control unit of the next logic stage E2; said signal Rout comes from non-delayed path 10 on output of delay circuit 4. In this situation signal Rout is transmitted to the control unit of the next logic stage E2 without any delay.

On the other hand, if compared signals Dout and Doutr are not identical, this indicates that a soft error has occurred. Comparer 6 then transmits the signal carrying the data ALEA to control unit 3 and programmable delay circuit 7 indicating that the compared signals are different and that a soft error has therefore been detected. As soon as the signal carrying the data ALEA is received, control unit 3 again transmits a new delayed data capture signal to first latch circuit 2A. This capture signal commands latch circuit 2A to record the status of signal Din a second time after another delay of duration DL. This new data capture signal is therefore supplied to latch circuit 2A with a delay relative to the first capture signal transmitted Lt equal to twice the duration of DL where duration DL is defined as being greater than the duration of soft error pulse Derreur. Since it is assumed that soft error does not occur twice, it is assumed that the recorded signal Din is now correct. The signal output by latch circuit 2A, which consists of signal din at the instant of the capture signal delayed by a duration of twice duration DL, is then transmitted to the logic calculation unit 5 of the next stage E2.

In this situation, which occurs when a soft error is detected, signal Rout follows delayed path 9 and is transmitted via programmable delay circuit 7 to the control unit of the next logic stage E2 with a delay equal to twice duration DL, i.e., a delay greater than twice the duration of the soft error Derreur if a soft error is detected.

Programmable delay circuit 7, which is controlled by the signal ALEA/NO-ALEA transmitted by comparer 6 is used to select one of the two paths 9 or 10 from delay circuit 4 to transmit request signal Rout to the control unit of the next logic stage E2.

In another embodiment of the invention the control unit may behave differently to handle a situation in which multiple soft errors are detected. In this embodiment the assumption that soft error is a non-recurring event that cannot occur two or more times consecutively is abandoned. Even though this situation is highly improbable, this second embodiment of the invention can take it into consideration.

This second embodiment of the invention may also be described with reference to FIG. 3. Detection of soft error is performed in the same way as in the first embodiment described above with reference to FIG. 3.

When no soft error is detected, i.e., when signals Dout and Doutr are identical, the circuit of the invention operates similarly to the first embodiment.

However, in the second embodiment when signals Dout, consisting of signal Din at the instant of signal Lt, and Doutr, consisting of signal Din at the instant of delayed signal Ltr, are not identical, the signal carrying the data ALEA indicating detection of an soft error is transmitted to control unit 3 and programmable delay circuit 7 by comparer 6 and the same protocol as before is again implemented.

Therefore when the signal carrying the data ALEA is transmitted to control unit 3, the status of signal Din is again recorded, but this time in the two latch circuit 2A and 2B in the same way as before, and not solely in the first latch circuit 2A as in the first embodiment. In the second embodiment it is considered that the newly recorded signal Din is not necessarily correct and that a new soft error may have occurred consecutively to the first.

Control unit 3 therefore provides a new capture signal to first latch circuit 2A in order to record the status of signal Din a second time at the instant of this capture signal, and a capture signal delayed by a duration equal to DL in second latch circuit 2B in order to record the status of signal Din at the instant of the said delayed capture signal.

The signal on the output terminal of latch circuit 2A, consisting of signal Din at the instant of the new capture signal, is compared in comparer circuit 6 with the signal on the output terminal of latch circuit 2B, consisting of signal Din at the instant of the new delayed capture signal.

The same protocol is repeated in a loop until no soft error is detected, i.e., until the signals compared in comparer circuit 6 are identical. Programmable delay circuit 7 then introduces a delay of a duration equal to: (number of soft errors detected)*2*DL. In the second embodiment of the invention request signal Rout is therefore transmitted to the control unit of the next logic stage E2 with a delay of a duration equal to: (number of soft errors detected)*2*DL, where DL is a duration greater than the known duration of the soft error pulse Derreur. This is possible because the data item Din is always present. As long as the error has not been corrected the control circuit does not acknowledge the data item by activating the signal Ain. This is a main property of micro-pipeline type asynchronous circuits.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. An electronic circuit comprising:
an asynchronous circuit with a micro-pipeline type instruction execution mode designed to detect and correct soft error in digital integrated circuits, the asynchronous circuit comprising:
at least one logic stage, each of the at least one logic stage comprising:
a logic calculation unit whose output terminal transmits an output signal;
a first recording means a first input terminal of which being coupled to the output terminal of the logic calculation unit; and
a control unit one of whose three output terminals transmits a first data capture signal applied to a second input terminal of the first recording means, the other two output terminals of the control unit being respectively coupled to an input terminal of a control unit of a previous logic stage, and to an input terminal of a control unit of a next logic stage by means of a delay line; and
wherein the asynchronous circuit also comprises:
a second recording means one of whose two input terminals is coupled to the output terminal of the logic calculation unit;
means in the control unit for delaying the first data capture signal and providing a second data capture signal that is applied to the second recording means;
a comparer circuit one of whose two input terminals is coupled to the output terminal of the first recording means and whose other input terminal is coupled to the output terminal of the second recording means, the comparer circuit supplying an output signal that indicates in a first status that no soft error is present and in a second status that a soft error is present; and
a programmable delay line whose first input terminal is coupled to the output terminal of the comparer circuit, a second input terminal being coupled to the output terminal of the delay line via a first delayed path and a last input terminal is coupled to the output terminal of the delay line via a second non-delayed path.

2. The electronic circuit of claim 1, wherein the means, in the control unit, for delaying the first data capture signal comprises a chain of inverters.

3. The electronic circuit of claim 1, wherein the means, in the control unit, for delaying the first data capture signal comprises an RC circuit.

4. The electronic circuit of claim 1, wherein the first delayed path comprises a circuit that introduces a delay of a duration greater than twice the duration of a soft error.

5. The electronic circuit of claim 1, wherein the first and second recording means comprise bistable circuits.

6. The electronic circuit of claim 5, wherein the means, in the control unit, for delaying the first data capture signal comprises a chain of inverters.

7. The electronic circuit of claim 5, wherein the means, in the control unit, for delaying the first data capture signal comprises an RC circuit.

8. The electronic circuit of claim 5, wherein the first delayed path comprises a circuit that introduces a delay of a duration greater than twice the duration of a soft error.

9. A method for detecting and correcting soft error in an asynchronous circuit, the method comprises the steps of:
   recording in a first recording means the status of a signal output by a calculation unit;
   recording in a second recording means the status of the signal output by the logic calculation unit with a delay the duration of which being longer than a pulse duration of a soft error; and
   comparing the recorded signals from the first and second recording means and transmitting a signal carrying information corresponding to one of a first status in which the compared signals are identical and a second status in which the compared signals are different, and for the first status:
      providing a request signal for a control unit of a next logic stage without any delay, and
   for the second status:
      recording the status of the signal output by the logic calculation unit in the first recording means a second time after another delay the duration of which is longer than the pulse duration of an error, and then sending a request signal to the control unit of the next logic stage with a delay of a duration twice as long as the pulse duration of a soft error.

10. A method for detecting and correcting multiple soft errors in an asynchronous circuit, the method comprises the steps of:
   recording in a first recording means the status of a signal output by a calculation unit;
   recording in a second recording means the status of the signal output by the logic calculation unit with a delay the duration of which being longer than a pulse duration of a soft error; and
   comparing the recorded signals from the first and second recording means and transmitting a signal carrying information corresponding to one of a first status in which the compared signals are identical and a second status in which the compared signals are different, and for the first status:
      providing a request signal for a control unit of a next logic stage without any delay, and
   for the second status:
      repeating in a loop until no soft error is detected, the following steps a), b) and c):
      a) recording in a first recording means (2A) the status of a signal (Din) output by a calculation unit (1);
      b) recording in a second recording means (2B) the status of the said signal (Din) output by the said logic calculation unit (1) with a delay the duration (DL) of which is longer than the pulse duration of a soft error (Derreur);
      c) comparing the recorded signals (Dout, Doutr) in a comparer circuit until the compared signals are identical indicating no soft error is detected, then transmitting request signal (Rout) to the control unit of the next logic stage (E2) with a delay of a duration equal to: (number of soft errors detected)*2*DL, where DL is a duration greater than the known duration of a soft error pulse.

11. An integrated circuit comprising:
   an asynchronous circuit with a micro-pipeline type instruction execution mode designed to detect and correct soft error in digital integrated circuits, the asynchronous circuit comprising:
      at least one logic stage, each of the at least one logic stage comprising:
         a logic calculation unit whose output terminal transmits an output signal;
         a first recording means a first input terminal of which being coupled to the output terminal of the logic calculation unit; and
         a control unit one of whose three output terminals transmits a first data capture signal applied to a second input terminal of the first recording means, the other two output terminals of the control unit being respectively coupled to an input terminal of a control unit of a previous logic stage, and to an input terminal of a control unit of a next logic stage by means of a delay line; and
      wherein the asynchronous circuit also comprises:
         a second recording means one of whose two input terminals is coupled to the output terminal of the logic calculation unit;
         means in the control unit for delaying the first data capture signal and providing a second data capture signal that is applied to the second recording means;
         a comparer circuit one of whose two input terminals is coupled to the output terminal of the first recording means and whose other input terminal is coupled to the output terminal of the second recording means, the comparer circuit supplying an output signal that indicates in a first status that no soft error is present and in a second status that a soft error is present; and
         a programmable delay line whose first input terminal is coupled to the output terminal of the comparer circuit, a second input terminal being coupled to the output terminal of the delay line via a first delayed path and a last input terminal is coupled to the output terminal of the delay line via a second non-delayed path.

12. The integrated circuit of claim 11, wherein the means, in the control unit, for delaying the first data capture signal comprises a chain of inverters.

13. The integrated circuit of claim 11, wherein the means, in the control unit, for delaying the first data capture signal comprises an RC circuit.

14. The integrated circuit of claim 11, wherein the first delayed path comprises a circuit that introduces a delay of a duration greater than twice the duration of a soft error.

15. The integrated circuit of claim 11, wherein the first and second recording means comprise bistable circuits.

16. The integrated circuit of claim 15, wherein the means, in the control unit, for delaying the first data capture signal comprises a chain of inverters.

17. The electronic circuit of claim 15, wherein the means, in the control unit, for delaying the first data capture signal comprises an RC circuit.

18. The electronic circuit of claim 15, wherein the first delayed path comprises a circuit that introduces a delay of a duration greater than twice the duration of a soft error.

19. An electronic device comprising:
- an asynchronous circuit designed to detect and correct soft error in digital integrated circuits, the asynchronous circuit comprising:
  - a logic calculation unit including an output that transmits an output signal;
  - a first recording means having a first input coupled to the output of the logic calculation unit;
  - a second recording means having an input coupled to the output of the logic calculation unit;
  - a first control unit having three outputs, a first output couples a first data capture signal to a second input of the first recording means, the other two outputs of the first control unit being respectively coupled to an input of a second control unit of a first logic stage, and to an input of a third control unit of a second logic stage by means of a first delay line; and
  - means in the first control unit for delaying the first data capture signal and providing a second data capture signal that is applied to the second recording means;
  - a comparer circuit having a first input coupled to an output of the first recording means and a second input coupled to an output of the second recording means, the comparer circuit supplying an output signal that indicates one of
    - a no soft error is present, and
    - a soft error is present; and
  - a programmable delay line having a first input coupled to an output of the comparer circuit, a second input being coupled to the output of the first delay line via a first delayed path and a third input being coupled to the output of the first delay line via a second non-delayed path.

* * * * *